Jan. 29, 1957
W. R. RAUTH, JR
2,779,910
THREE-PHASE MAGNETIC AMPLIFIER
Filed Sept. 18, 1952
2 Sheets-Sheet 1
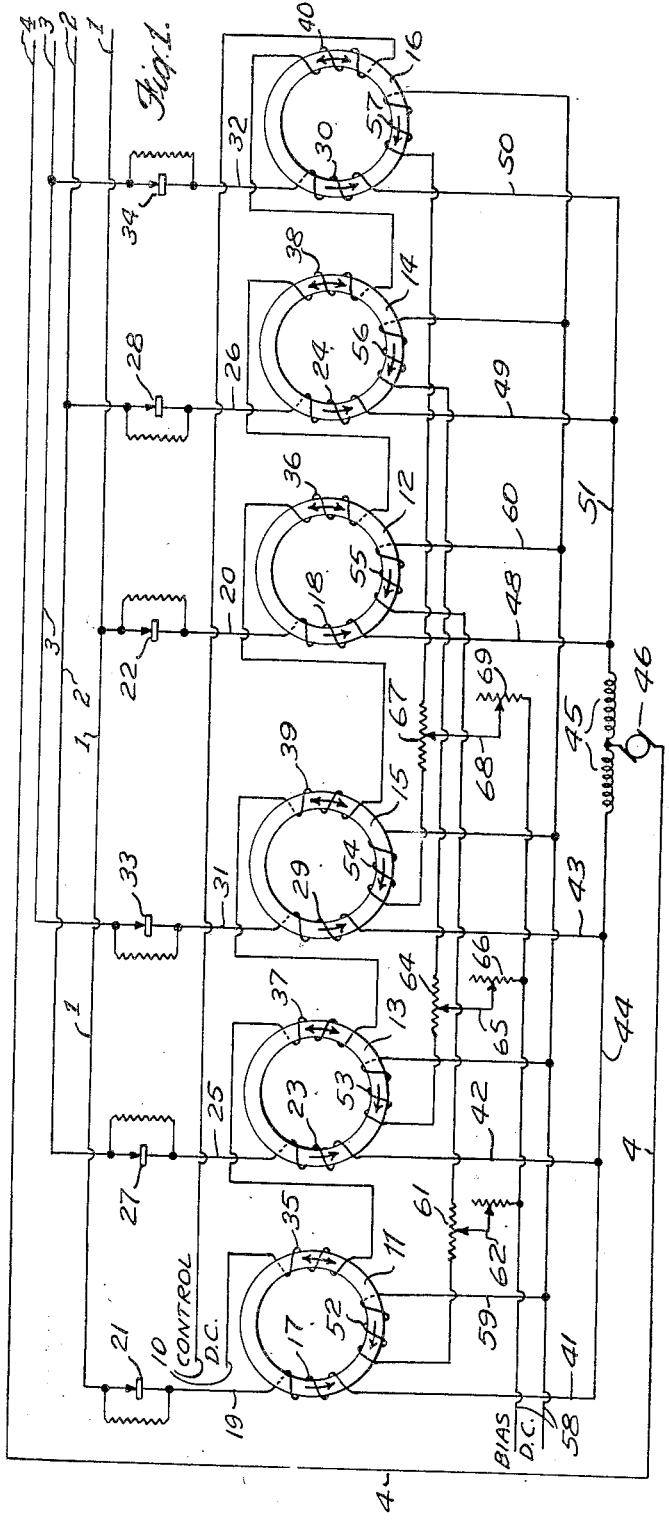
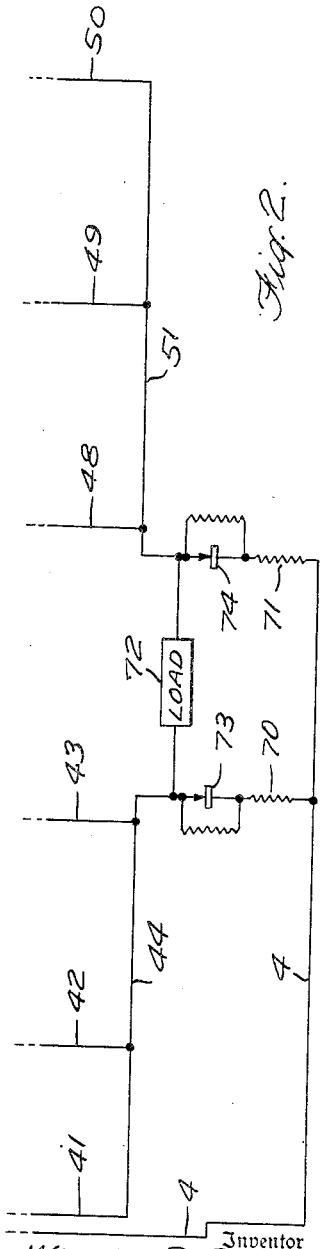
Inventor
WILLIAM R. RAUTH, Jr.
By Victor S. Boret
Attorney Jan. 29, 1957

W. R. RAUTH, JR 2,779,910

THREE-PHASE MAGNETIC AMPLIFIER

Filed Sept. 18, 1952

Inventor
WILLIAM R. RAUTH, Jr
By
Victor D. Borst
Attorney

United States Patent Office 2,779,910
Patented Jan. 29, 1957

2,779,910

THREE-PHASE MAGNETIC AMPLIFIER

William R. Rauth, Jr., New Hyde Park, N. Y., assignor to Sperry Rand Corporation, a corporation of Delaware Application September 18, 1952, Serial No. 310,271

2 Claims. (Cl. 323—89)

This invention relates to electrical amplifying systems and especially to such systems employing magnetic amplifiers of the saturable core reactor type. In particular the invention relates to the utilization of polyphase A. C. current for power amplification and involves the adaptation of magnetic amplifiers for the purpose.

Embodiments of the invention are especially adapted for amplifying weak electrical input signals for low impedance loads and are useful, for example, for servo units where small signal currents control a relatively large output.

One of the objects of the invention is to obtain a comparatively smooth application of the amplified power from A. C. controlled currents, while eliminating any effect from lack of symmetry in the wave form of the A. C. supply and having the effective polarity of the output current sensitive to variations in the signal or control current in opposite direction from a predetermined value, that is, variations in the sense of the control. Other objects are accuracy, sensitivity and reliability of response to the input or control current. Still other objects will appear from the following further exposition and description of the invention.

The invention contemplates utilizing a polyphase current, preferably a three phase A. C. current from a four wire A. C. system, as the controlled current and differentially controlling the phases in succession in response to the input or control current so that the output power is the result of the differential and is maximum at fractional intervals of each 360° depending upon the number of phases. For example, with three phase controlled current the peak power will be at each 120 electrical degrees.

For this purpose two controlled windings are connected in parallel to each phase through unidirectional conductors and the control current oppositely affects the two windings. The outputs of corresponding controlled windings are connected together to the opposite side of the line through respective impedances and the power consuming unit is responsive in direction and power to the differential in voltage drop across the impedances. Thus a D. C. output current having fluctuations of small amplitude is obtained from both sets of controlled windings which currents vary in response to the control and the differential of which may be used to operate a polarity sensitive load.

The invention also contemplates the use of bias windings to determine the position of the operating point on the hysteresis curve, that is, the flux level or the amount of flux in the core at the beginning of the conductive phase of the reactor winding. If uncontrolled the residual flux builds up in the iron and the bias winding provides means to counteract that tendency and to regulate the flux level for each conductive phase.

The invention will be described with reference to the circuit arrangements illustrated in the accompanying drawings.

Fig. 1 is a circuit diagram of one embodiment of the invention;

Fig. 2 is a partial diagram of a circuit similar to that of Fig. 1 but showing a modified form of load arrangement.

Figure 3:
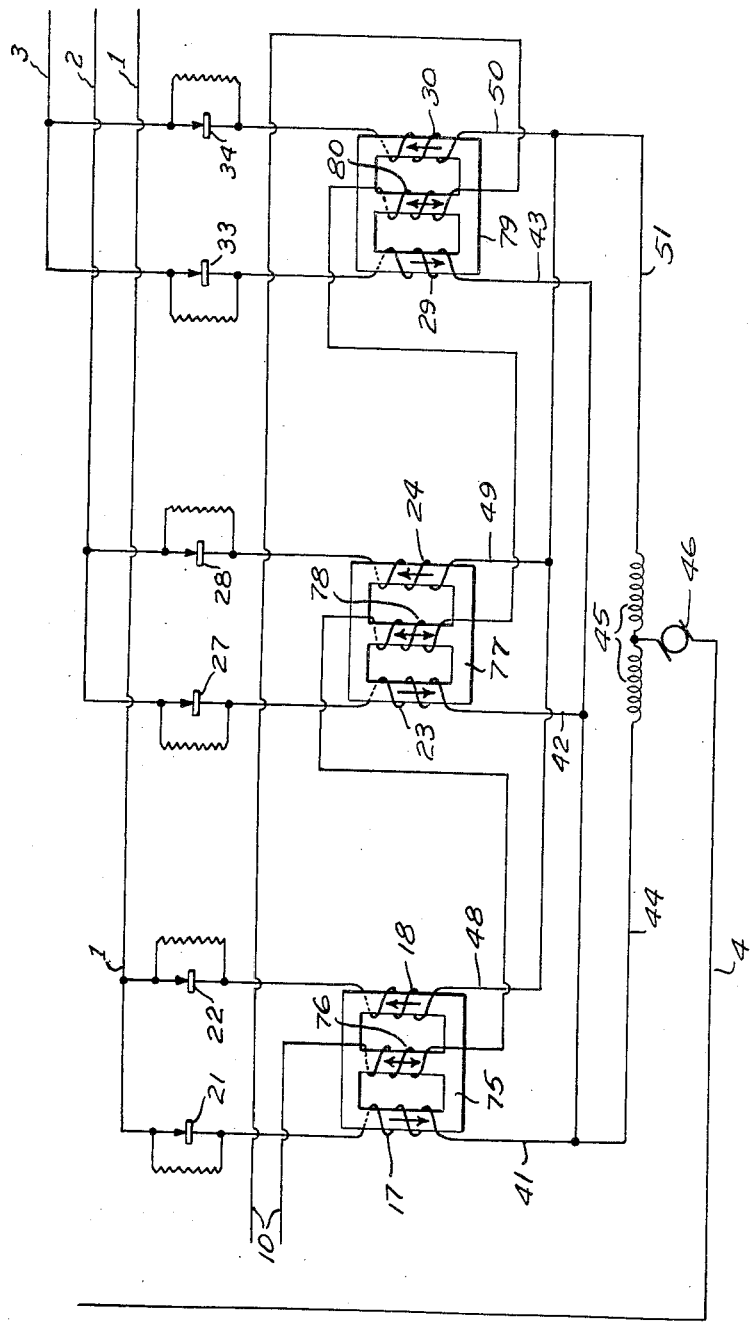
Fig. 3 is a circuit diagram corresponding to Fig. 1 employing a modified core construction.

Referring to Fig. 1, the signal or input current which is to be used as the control for the amplified power output is represented as a D. C. current though obviously other forms of current may be employed. This control current is applied to leads 10, while the controlled current which provides the power output is a three phase current from a four wire A. C. system having phase conductors 1, 2 and 3 and neutral lead 4.

A pair of output or reactor windings are connected to each phase conductor in parallel and are differentially controlled by the input or signal current, the three which are controlled in one sense having their outputs coupled and connected through an impedance to the neutral lead and the three controlled in the opposite sense having their outputs coupled and connected to the neutral lead through another impedance. In the illustrated construction the impedances are a split field winding of a series D. C. motor, the center tap being connected through the armature of the motor to the neutral lead.

There are three magnetic amplifiers, each having two closed magnetic circuits consisting in this case of separate iron ring cores with the controlled windings of the respective phases inductively disposed on them and with control windings disposed on them in opposing relation. A unidirectional conductor in series with each controlled winding is conductive on the same half cycle.

As illustrated cores 11 and 12 constitute one pair of closed magnetic circuits, core 13 and 14 constitute a second pair and cores 15 and 16 constitute a third pair. Output windings 17 and 18 on cores 11 and 12, respectively, are connected by input leads 19 and 20, respectively, to phase conductor 1. One way valves 21 and 22 in these leads 19 and 20, respectively, are similarly poled.

Similarly output windings 23 and 24 on cores 13 and 14, respectively, are connected by leads 25 and 26, respectively, to phase conductor 2 through one way valves 27 and 28, respectively, poled similarly to valves 21 and 22; and output windings 29 and 30 on cores 15 and 16, respectively, are connected by leads 31 and 32 to phase conductor 3 through one way valves 33 and 34, respectively, also poled similarly to valves 21 and 22. Obviously these one way valves may be poled in the opposite direction, the only requisite being that they be similarly poled.

The control circuit includes windings in series on the several cores, those on cores 11, 13 and 15 being effective in a sense opposite that of the control windings on cores 12, 14 and 16. As shown the windings 35, 37 and 39 on cores 11, 13 and 15, respectively, are connected so that they affect the saturation in the same sense, and windings 36, 38 and 40 on cores 12, 14 and 16 are connected so that they affect the saturation in the same sense which is opposite that of windings 35, 37 and 39.

The output leads 41, 42 and 43 of coils 17, 23 and 29, respectively, are connected to a common conductor 44 which is connected to one end of a split field winding 45, the center tap of which is connected to one brush of the D. C. motor 46, the other brush being connected to neutral lead 4.

Similarly the output leads 48, 49 and 50 of reactor windings 18, 24 and 30, respectively, are connected to a common conductor 51 which is connected to the other end of the field winding 45.

If desired, bias windings may also be provided on the cores for the stated purpose of determining the operating point on the hysteresis curve. Such windings numbered 52, 53, 54, 55, 56, and 57 are disposed on the respective cores, those on each pair of cores being connected in parallel across D. C. bias circuit leads 58 through variable resistors operative selectively to vary the bias current in the two windings either similarly or inversely.

Thus one end of bias windings 52 and 55 are connected to one side of the bias line 58 by leads 59 and 60, respectively, and their opposite ends are connected to opposite ends of a resistor 61 having a slide contact which is connected by conductor 62 to a slide contact on resistor 63 connected with the other side of bias line 58.

Similarly the bias coils 53 and 56 on the pair of cores 13 and 14 have connection at one end to one side of the bias line and at the other end to the variable resistor 64 which is connected by conductor 65 to variable resistor 66 having connection with the other side of the bias line. Likewise the bias coils 54 and 57 on the pair of cores 15 and 16 have connection at one end to one side of the bias line and at the other end to variable resistor 67 which is connected by conductor 68 to variable resistor 69 and the other side of the bias line.

The one way valves are each shown as shunted by a resistor. This is optional and is required with certain types of valve to compensate for the effect of temperature changes.

The arrows on the cores indicate the direction of flux flow. The bias current will usually be in a direction to oppose that induced by the reactor winding although its polarity may be reversed. The polarity of the control current will depend, of course, upon the direction of the signal or the direction of the variance from a given reference. Depending upon its polarity, the current in one half or the other of field winding 45 will predominate and thus determine the direction of movement of the motor. The number of turns on the windings will normally be so selected and the bias currents will be so adjusted that the successive current impulses from the different phases will be equal. Occurring as they do at intervals of 120 electrical degrees, the fluctuations in the D. C. power current are small, and obviously the application can be made still smoother by filtering out the slight pulsations with a condenser.

Thus a three phase A. C. current is converted into a smooth unidirectional output current which may be employed to operate a servo motor and which will be sensitive to changes in the signal current in polarity and strength.

In place of a motor with a split field winding the load may be in a bridge circuit across the outputs of the two differentially controlled halves of the system, the direction of current through the load depending upon the distribution of the voltage drop in the respective branch circuits.

Thus, as shown in Fig. 2 the conductors 44 and 51 of Fig. 1 may be connected in parallel to lead 4 through resistors 70 and 71, respectively, and load 72 be connected across the conductors in advance of the resistors. The difference in potential at the two ends of the load connection will depend upon the difference in voltage drop across the resistors 70 and 71.

Preferably in this case one way valves 73 and 74 will be connected in series with the respective resistors and both poled in the same direction as the previously mentioned rectifiers, in order to avoid the existence of a closed loop including the load which would seriously affect the time constant.

The system shown in Fig. 3 differs from that shown in Fig. 1 in the core structure. In this case three legged cores are used and the two output windings of each pair are disposed on the outside legs and the control winding is on the central leg. Therefore the output windings must be oppositely wound in order that the flux of the single control winding will differentially affect the two reactance fluxes.

The core 75 is equivalent to the two ring cores 11 and 12 of Fig. 1 and has the two output windings 17 and 18 on its outer legs wound so that their fluxes flow in opposite directions in the center leg. There is a single control winding 76 in the center leg the flux of which will augment that of one reactor winding and oppose that of the other, as indicated by the arrows.

Similarly core 77 has output windings 23 and 24 in its outer legs and a single control winding 78 on the center leg in series with winding 76 and so wound as to have the same control effect on its respective output windings as winding 76 has on its output windings.

Likewise core 79 has the third pair of windings 29 and 30 on its outer legs under the like control of winding 80 on the center leg which is in series with the other two control windings.

As in Fig. 1, the three corresponding output leads 41, 42 and 43 are brought to one end of field winding 45 through the common lead 44, and the other three corresponding output leads 48, 49 and 50 are brought by lead 51 to the other side of the field winding.

No bias windings are shown in this circuit diagram but it will be understood that if desired bias windings may be provided on the several cores. For example a single bias winding may be disposed on each central leg or they may be disposed in pairs on the outer legs and connected to the bias circuit through variable resistors as shown in Fig. 1.

Other modifications in the circuit will readily occur to those skilled in the art within the principle of the invention as defined in the following claims.

What is claimed is:

1. Differential electrical amplifying means for use in polyphase circuits comprising a source of polyphase current, a separate conductor for each phase, a neutral conductor, a pair of closed magnetic circuits for each phase, an output winding on each magnetic circuit, the output windings of each pair having one end connected to the same phase conductor and the windings of the several pairs being thus connected to different phase conductors, a control circuit including control windings inductively disposed on the several magnetic circuits and wound to induce magnetic flux in opposite directions in the magnetic circuits of each pair relative to the flux induced by the output windings thereon, means conductively coupling the other ends of the output windings which are controlled in one sense, separate means conductively coupling the other ends of the output windings which are controlled in the opposite sense, a connection including an impedance between each of said coupling means and said neutral conductor, a reversible load connected to be responsive to the difference in voltage drop across the two impedances, and a unidirectional conducting device in each phase connection in series with the respective output winding, the said devices being similarly poled.

2. An amplifying system as defined in claim 1 together with a bias winding on each magnetic circuit and a source of E. M. F. connected to the bias winding, the bias windings on each pair of magnetic circuits being connected to the source of E. M. F. in parallel through common variable resistor means.

References Cited in the file of this patent

UNITED STATES PATENTS

| 2,229,952 | Whitely et al. | Jan. 28, 1941 |
| 2,414,936 | Edwards et al. | Jan. 28, 1947 |
| 2,622,239 | Bracutt | Dec. 16, 1952 |

OTHER REFERENCES

Publication: "The Transductor Amplifier," by Ulrick Krabbe, published in Sweden in 1947.

Publication entitled "Magnetic Amplifiers," Bulletin 20-A, by Vickers Inc., 1950.